United States Patent
Love et al.

(10) Patent No.: US 7,861,126 B2
(45) Date of Patent: Dec. 28, 2010

(54) IMPLEMENTATION-EFFICIENT MULTIPLE-COUNTER VALUE HARDWARE PERFORMANCE COUNTER

(75) Inventors: Carl E. Love, Beaverton, OR (US); Donald R. DeSota, Portland, OR (US); Jaeheon Jeong, Morrisville, NC (US); Russell M. Clapp, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/164,094

(22) Filed: Jun. 29, 2008

(65) Prior Publication Data

US 2008/0263263 A1 Oct. 23, 2008

Related U.S. Application Data

(63) Continuation of application No. 11/738,497, filed on Apr. 22, 2007, now Pat. No. 7,437,622, which is a continuation of application No. 10/672,758, filed on Sep. 27, 2003, now Pat. No. 7,272,754.

(51) Int. Cl.
*G06F 11/00* (2006.01)
(52) U.S. Cl. .......................... 714/47; 377/26; 708/672
(58) Field of Classification Search .................. 377/26, 377/37, 49, 15; 708/670, 672; 714/47, 724
See application file for complete search history.

(56) References Cited

U.S. PATENT DOCUMENTS

| 6,157,695 | A  | * | 12/2000 | Barna ........................... | 377/52 |
| 6,360,337 | B1 | * | 3/2002 | Zak et al. ....................... | 714/47 |
| 6,922,456 | B2 | * | 7/2005 | Greenlaw et al. .............. | 377/26 |

* cited by examiner

*Primary Examiner*—Philip Guyton
(74) *Attorney, Agent, or Firm*—Steven Lieske Bennett

(57) ABSTRACT

An implementation-efficient, multiple-counter value hardware performance counter is disclosed. A hardware counter of one embodiment includes a memory array and a hardware incrementer. The array stores counter values that are indexable by an index constructed based at least on the number of events to which the counter values correspond. The index may be constructed as a concatenation of a number of bits binarily representing the number of events, and a number of bits binarily representing the number of qualifiers to the events. The incrementer reads the counter values from the array, increments the counter values, and writes the resulting counter values back into the array. The array may be divided into banks over which the counter values are stored, where each bank has a separate instance of the incrementer. Each bank may have a separate instance of the index that indexes only those counters stored in the bank.

12 Claims, 4 Drawing Sheets

US 7,861,126 B2

IMPLEMENTATION-EFFICIENT MULTIPLE-COUNTER VALUE HARDWARE PERFORMANCE COUNTER

RELATED APPLICATIONS

The present patent application is a continuation of the pending patent application entitled "Implementation-efficient multiple-counter value hardware performance counter," filed on Apr. 22, 2007, and assigned Ser. No. 11/738,497.

BACKGROUND OF THE INVENTION

1. Technical Field

This invention relates generally to hardware performance counters, and more particularly to multiple-counter value hardware performance counters.

2. Description of the Prior Art

Hardware performance counters are used in many computing systems to collect information on the operation of hardware. They typically are present in processors and/or chipsets that support the processors. A hardware performance counter typically includes an event specifier, various control bits, a register to hold the count value, and increment hardware. To maintain multiple count values, such as to count the occurrences of different events, multiple complete hardware performance counters usually have to be maintained. This is implementation inefficient, and requires redundant hardware components, such as redundant instances of the increment hardware, for the hardware performance counters.

As a result, typically only a limited number of counters are provided, relative to the number of events of which occurrences can be counted. This means that the occurrences of only a few events may be counted during a specific time period. To obtain correct results for a large number of events usually requires the operations to be constant across multiple time periods. A subset of the events is then measured within each time period. This limits the usefulness of the hardware performance counters, and may constrain the construction of computer programs that rely on the counters to count event occurrences.

Software-based performance counters may alternatively be employed. Such counters are typically defined using an array in a high-level language, or having individual variables for each event being counted. An array implementation may have one or more dimensions, depending on whether qualifiers to the events are to be considered when collecting count values. One dimension of the array is assigned to the events, and the second dimension is assigned to the qualifiers, for instance. High-level languages then store the multidimensional array within physical memory, which is conceptually a single dimensional array.

However, the programmer has no control over how the compiler and the hardware then translates a software index to the multidimensional array down to physical addresses. That is, the programmer has no control over how the multidimensional array maps to physical memory. This can lead to degradation in performance and/or in memory utilization, inhibiting the efficiency of software-based performance counters. Furthermore, software-based performance counters are likely to be inherently slower than hardware-based performance counters, since they really on general-purpose hardware and machine-level instructions for implementation and execution, as opposed to special-purpose hardware that has its operations coded into the hardware. Software-based performance counters are thus likely to be less efficient than hardware-based performance counters.

For these described reasons, as well as other reasons, there is a need for the present invention.

SUMMARY OF THE INVENTION

The invention relates to an implementation-efficient, multiple-counter value hardware performance counter. A hardware counter of one embodiment of the invention includes a memory array and a hardware incrementer. The memory array stores counter values that are indexable by an index constructed based at least on the number of events to which the counter values correspond. The hardware incrementer reads the counter values from the memory array by values of the index, increments the counter values, and writes the counter values as have been incremented back into the memory array.

A method of one embodiment of the invention generates via hardware a value of an index, based on one of a number of events, a count value for an occurrence of which is to be incremented. The method reads, by the value of the index, the counter value from the memory array that is indexed by the index. The counter value is incremented via hardware, and is written back to the memory array.

A system of one embodiment of the invention includes a number of nodes. Each node has a processor and a performance counter operatively coupled to the processor. The performance counter counts occurrences of events, and has a lesser number of hardware incrementers than the number of the events of which the performance counter counts the occurrences.

Other features and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DESCRIPTION OF THE PREFERRED EMBODIMENT

Multiple-Counter Value Hardware Performance Counter

Figure 1:
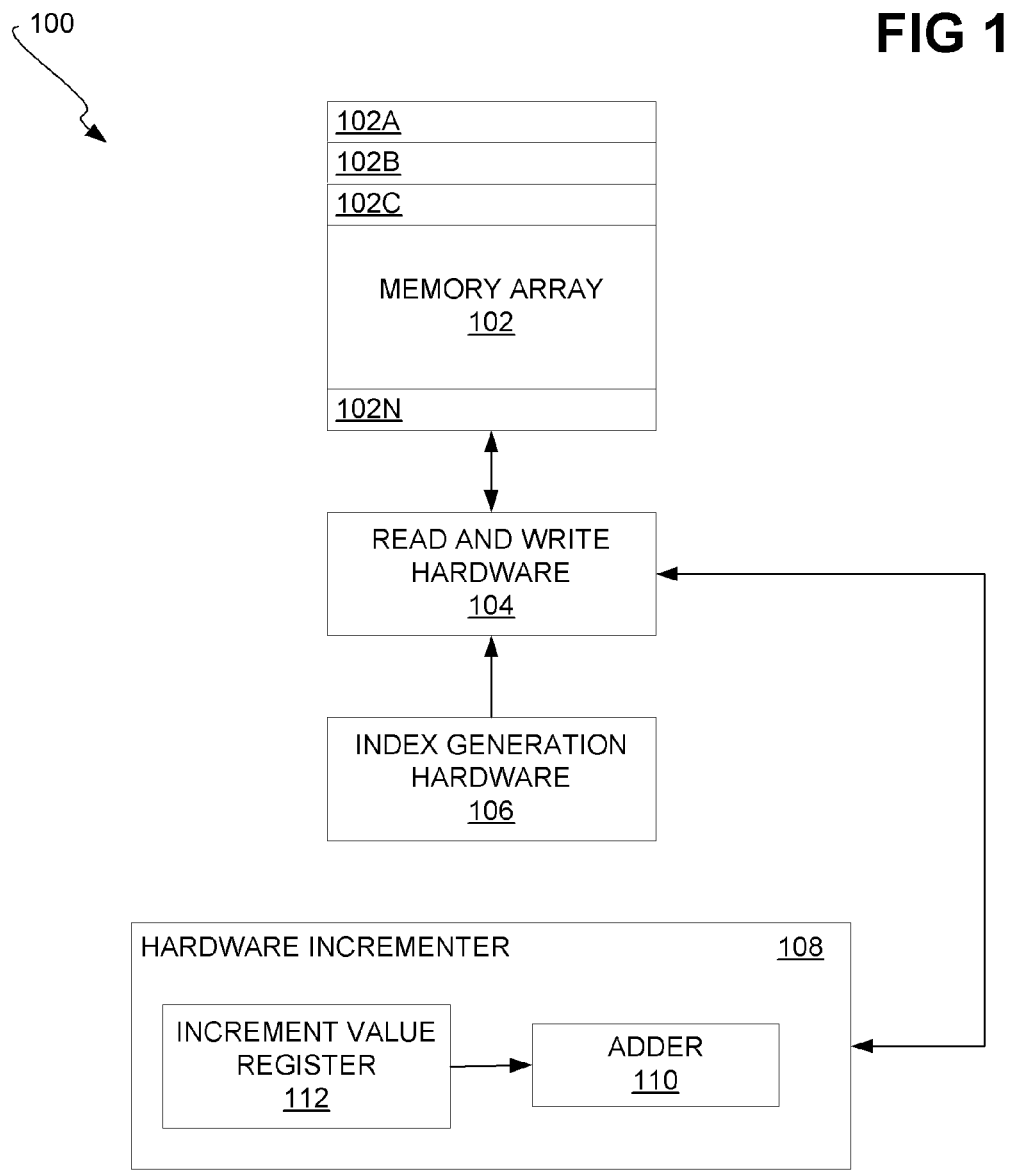
FIG. 1 is a diagram of a multiple-counter value hardware performance counter, according to an embodiment of the invention, and is suggested for printing on the first page of the patent.

FIG. 1 shows a multiple-counter value hardware performance counter 100, according to a preferred embodiment of the invention. The counter 100 includes a memory array 102, read and write hardware 104, index generation hardware 106, and a hardware incrementer 108. The counter 100 is implemented completely in hardware. For instance, the counter 100 may be a part of a processor, a chipset, or another type of semiconductor device, such as an application-specific integrated circuit (ASIC), or another type of IC.

The memory array 102 includes memory lines 102A, 102B, 102C, . . . , 102N in which counter values are stored. The counter values are used to maintain counts of occurrences of events, or event-and-qualifier combinations. A qualifier to an event may be an agent, a length, or another type of qualifier, as can be appreciated by those of ordinary skill within the art. The array 102 is addressable by index values of an index. That is, the physical addresses of the memory array 102 are addressable by index values of the index.

The index range is generally based at least on the number of the events that occurrences thereof are to be counted, and optionally on the number of the qualifiers that occurrences of event-and-qualifier combinations are to be counted. Preferably, the index is constructed as a concatenation of a number of bits that binarily represent the number of events, and a number of bits that binarily represent the number of qualifiers. Thus, each unique counter value corresponds to a unique combination of one of the events and one of the qualifiers. That is, the index preferably includes a field for each event and each qualifier.

For example, the index may have seven bits. If there are eight possible events, then three bits are needed to encode the events, since $2^3=8$. If there are sixteen different qualifiers to these events, then four bits are needed to encode the qualifiers, since $2^4=16$. Therefore, the index may be a concatenation of the three bits needed to binarily encode the events, and the four bits needed to binarily encode the qualifiers. There is then a unique index value within the index for each unique combination of one of the events and one of the qualifiers.

The read and write hardware 104 is dedicated hardware that reads and writes counter values from and to the memory lines of the memory array 102, as addressed by the index values of the index. Each of the memory lines of the array 102 corresponds to a different counter value that is addressable by a different index value of the index. The index generation hardware 106 generates the complete index based on the total number of events and the total number of qualifiers. The index generation hardware 106 also may generate an index value of the index for a given unique event-and-qualifier combination.

The hardware incrementer 108 reads a counter value from the memory array 102, as addressed by an index value, increments the counter value, such as in response to the occurrences of the event-and-qualifier combinations to which the counter values correspond, and writes the counter value as incremented back into the memory array 102. In one embodiment, the incrementer 108 includes a hardware adder 110 and an increment value register 112. The register 112 stores the increment value by which the counter value is to be incremented. This value may be one, greater than one, and may also be a negative value, such that the incrementer 108 actually decreases the counter values during the incrementation process. The adder 110 adds the increment value with the current count value of one of the memory lines of the memory array 102, and then stores the resulting sum back into the memory line as the updated count value.

As has been described, preferably the number of counter values stored in the memory lines of the memory array 102 corresponds to the number of unique event-and-qualifier combinations. Thus, if there are eight events, and sixteen qualifiers to the events, then 8×16=128 counter values are stored in the memory array, such as seven bits are needed to encode all the unique combinations into an index, since $2^7=128$. However, there may be combinations of events and qualifiers that will never occur. Therefore, the index generation hardware 106 may construct an index that encodes only the possibly occurring event-and-qualifier combinations, and not all the event-and-qualifier combinations. Such an index likely will utilize less bits in width, and require a smaller size of the memory array 102, thus conserving memory.

Figure 2:
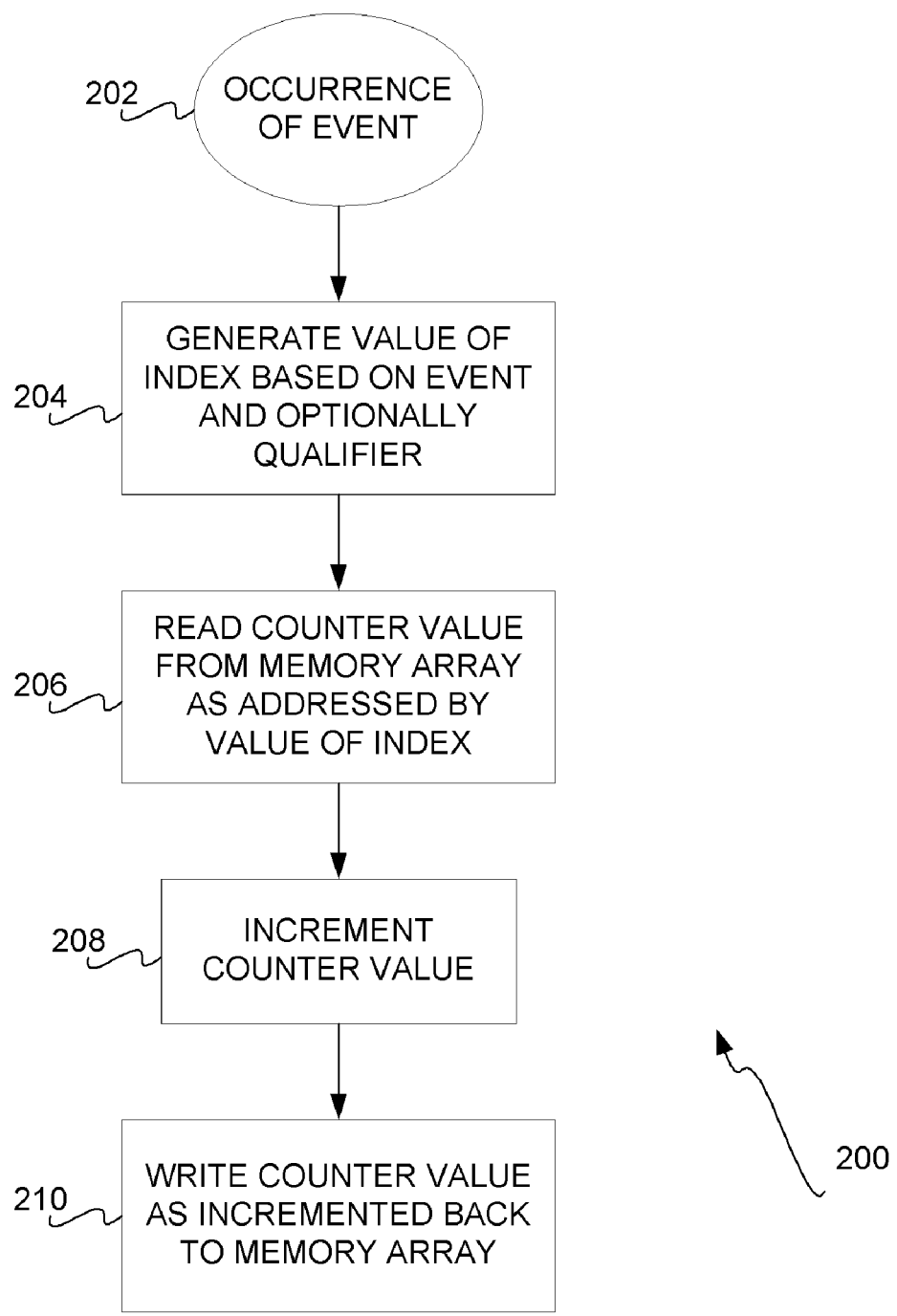
FIG. 2 is a flowchart of a method for using a multiple-counter value hardware performance counter, according to an embodiment of the invention.

FIG. 2 shows a method 200 for using a multiple-counter value hardware performance counter, according to an embodiment of the invention. The method 200 may be utilized in conjunction with the hardware performance counter 100 of FIG. 1, and the method 200 is specifically described in relation to the performance counter 100 as an example. First, an event occurs that is to be counted (202).

In response, an index value of the index is generated, based on the event that occurred, and optionally on a qualifier to the event (204), such as by the index generation hardware 106. For example, there may be eight total events and sixteen total qualifiers to the events, where the index is constructed as seven bits concatenating three bits corresponding to the number of events and four bits corresponding to the number of qualifiers. If the third event occurred, which is binary 0×011, and the tenth qualifier is applicable, which is binary 0×1010, then the index value that is constructed is 0×011 concatenated with 0×1010, or 0×0111010. This means that the counter value for the third event and the tenth qualifier is stored in the memory array 102 as addressed by the index value 0×0111010.

The counter value corresponding to the event that occurred, and optionally the qualifier to the event, is read from the memory array 102, as addressed by the index value that has been generated (206). The hardware incrementer 108, for instance, may cause the read and write hardware 104 to read the counter value. The counter value is incremented (208), such as by the adder 110 of the hardware incrementer 108 adding the increment value stored in the register 112 with the counter value. The counter value, as has been incremented, is then written back to its location in the memory array 102 (210). For instance, the read and write hardware 104 will write the counter value back to the location from which it was read, as addressed by its index value. In the event a read, increment, and write can not be done in a single cycle and an event can occur every cycle, a bypass path may need to be added to the memory array.

In one embodiment of the invention, the counting mechanism works on the assumption that events that are to be counted are mutually exclusive, and that one event is outstanding at a given time, or measurements per event are repeated over time if the events are not mutually exclusive. For example, there may be four events, A, B, C, and D, and $c(A)=c(B)+c(C)+c(D)$, where $c(X)$ is the count of event X. In this embodiment, it may be difficult to measure $c(A)$ and $c(B)$ with one increment hardware without counting $c(C)$ and $c(D)$, since $c(A)$ should be incremented when $c(B)$ is incremented.

Multi-Node System

Figure 3:
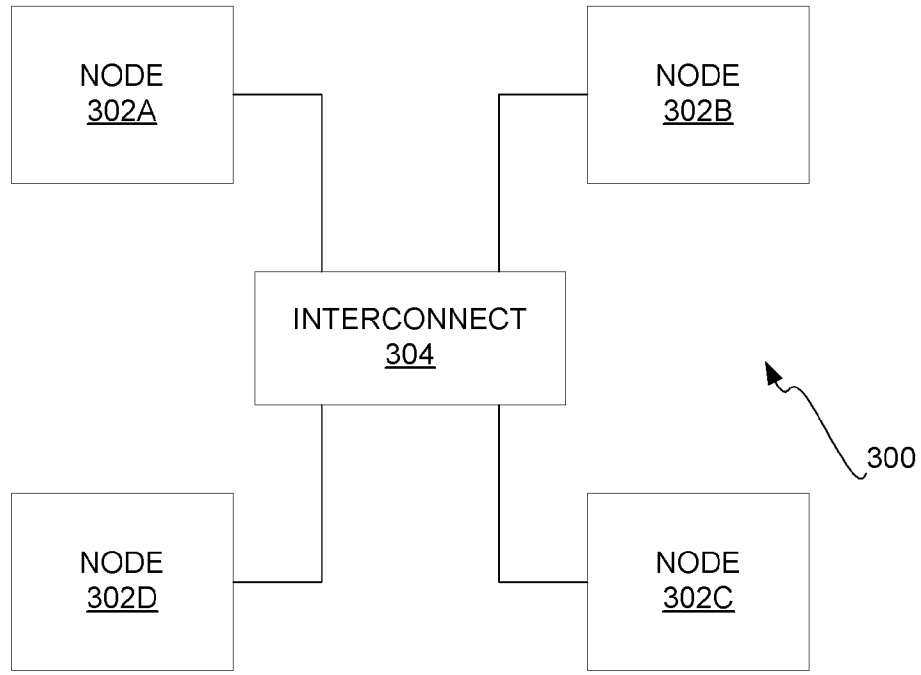
FIG. 3 is a diagram of a multi-node system, in conjunction with which embodiments of the invention may be implemented.

FIG. 3 shows a multi-node system 300, in conjunction with which embodiments of the invention may be practiced. The multi-node system 300 includes nodes 302A, 302B, 302C, and 302D, collectively referred to as the nodes 302. The nodes 302 may also be referred to as quads in one embodiment. The nodes 302 are connected to one another via an interconnect 304. The nodes 302 may be non-uniform memory architecture (NUMA) nodes, as can be appreciated by those of ordinary skill within the art. Each of the physical nodes 302 may be divided into two logical nodes, such that where there are four of the physical nodes 302, there may be eight logical nodes.

Figure 4:
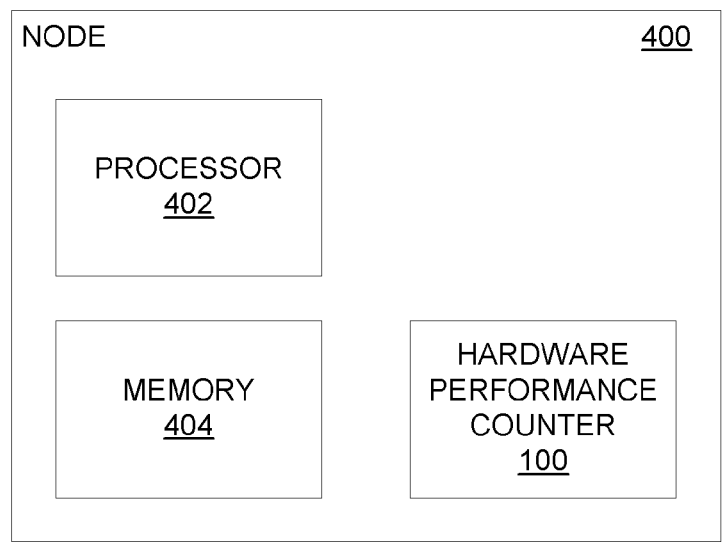
FIG. 4 is a diagram of one of the nodes of the multi-node system of FIG. 3, according to an embodiment of the invention.

FIG. 4 shows an example node 400, according to an embodiment of the invention. The node 400 may implement each of the nodes 302 in one embodiment of the invention. The node 400 specifically depicted in FIG. 4 includes a processor 402, memory 404, and the multiple-count value hardware performance counter 100. The node 400 may include other components in addition to and/or in lieu of those depicted in FIG. 4. For instance, the node 400 may have an additional processor, additional memory, an IO bridge, a memory controller, and another multiple-count value hardware performance counter 100, in the embodiment of the invention where the node 400 is divisible into two logical nodes.

The memory 404 is preferably local to the processor 402 of the node 400, and remote to the other processors of the other nodes, in the embodiment of the invention implementing a NUMA system. The hardware performance counter 100 is depicted in FIG. 4 as separate from the processor 402. For instance, the counter 100 may be a part of an application-specific integrated circuit (ASIC), or another type of IC. However, in an alternative embodiment of the invention, the counter 100 may be a part of the processor 402 or another chip on the node. The processor 402 preferably generates requests and responses relating to the memory 404 of the node 400 of which it is a part, as well as generates requests relating to the remote memories of the other nodes.

The hardware performance counter 100 has a lesser number of hardware incrementers, such as the hardware incrementer 108 of FIG. 1, than the number of events or event-and-qualifier combinations of which the counter 100 counts occurrences. For instance, where the counter 100 is implemented in accordance with that which has been described in conjunction with FIG. 1, there is a single hardware incrementer 108, and a relatively large number of events or event-and-qualifier combinations that can be counted with the count values stored in the memory array 102 of FIG. 1. As is described in the next section of the detailed description, even where there is more than one hardware incrementer, the number of event or event-and-qualifier event combinations that can be counted with the count values is still greater than the number of hardware incrementers.

Alternative Embodiment: Memory Banks

Figure 5:
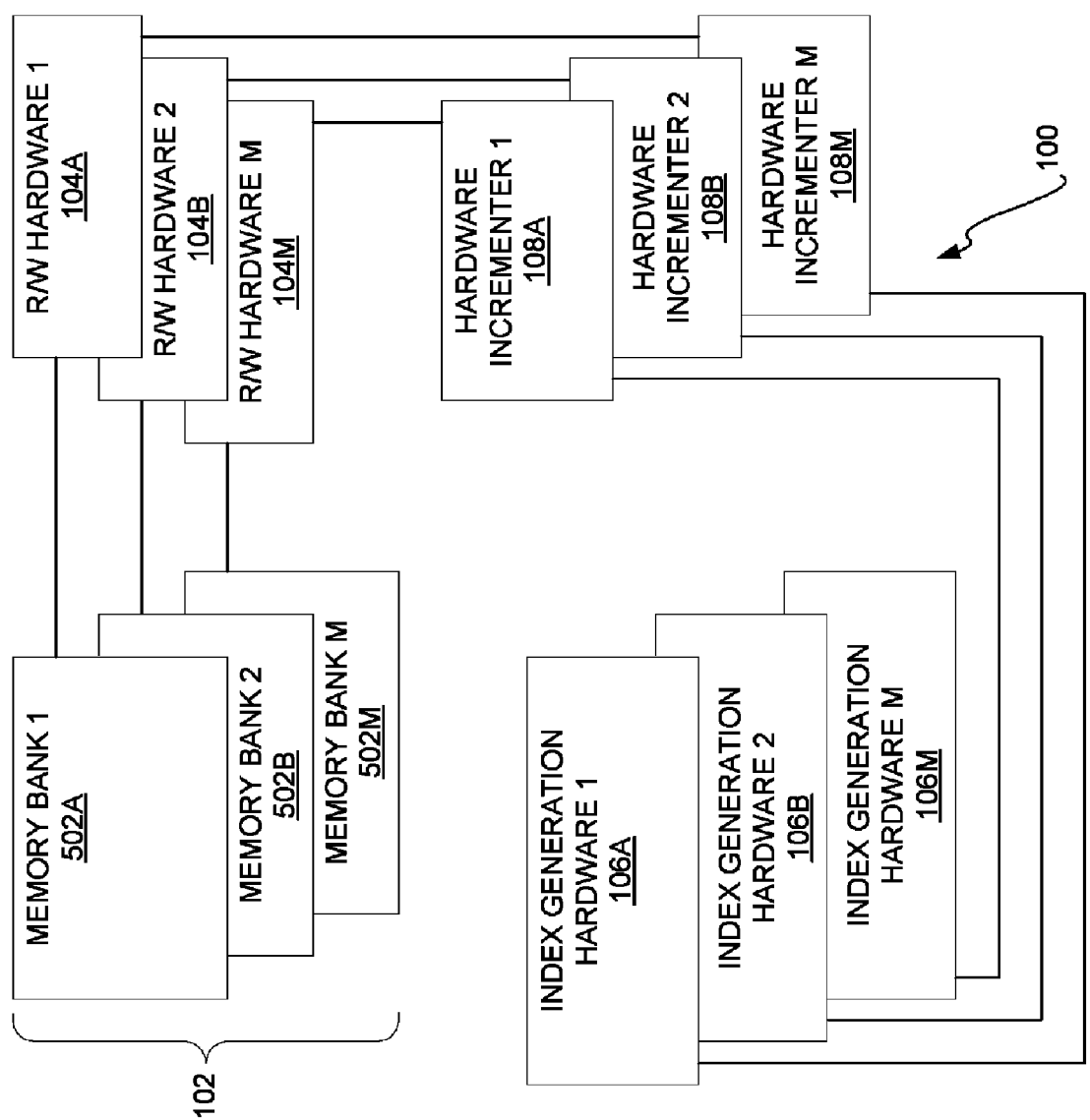
FIG. 5 is a diagram of a multiple-counter value hardware performance counter utilizing multiple memory banks for the memory array, according to an alternative embodiment of the invention.

FIG. 5 shows the multiple-value hardware performance counter 100, according to an alternative embodiment of the invention. The memory array 102 is divided into a plurality of memory banks 502A, 502B, . . . , 502M, collectively referred to as the memory banks 502. For each memory bank there is associated read and write hardware, associated index generation hardware, and an associated hardware incrementer. That is, for the memory banks 502, there are associated read and write hardware 104A, 104B . . . , 104M, associated index generation hardware 106A, 106B, . . . , 106M, and associated hardware incrementers 108A, 108B, 108M. The individual hardware 104, hardware 106, and hardware incrementers 108 each perform the functionality that has been ascribed to them previously, but with respect to only a specific corresponding one of the banks 502.

The counter values are stored over the memory banks 502, such that each of the memory banks 502 stores the counter values for occurrences of only some of the events or event-and-qualifier combinations. In one embodiment, the index still globally indexes the counter values over the memory banks 502 as a whole. In another embodiment, however, each of the memory banks 502 has a separate instance of the index, which indexes only those of the counters stored in the memory bank. Thus, each of the index generation hardware 106 for the memory banks 502 generates the separate instance index for a specific corresponding one of the memory banks 502. There are M instances of the read and write hardware 104, the hardware 106, and the hardware incrementers 108. However the number M is still less than the number N of the count values stored over the memory banks 502.

Advantages over the Prior Art

Embodiments of the invention allow for advantages over the prior art. In traditional hardware performance counters, a counter can usually only count one count value. This means that to count more than one count value, multiple instances of a counter must be constructed, including, for instance, duplicative hardware incrementers, index generation hardware, and read and write hardware. By comparison, in the embodiment of the invention described in conjunction with FIG. 1, a single instance of this hardware, such as a single read and write hardware 104, a single index generation hardware 106, and a single hardware incrementer 108, is used to count N count values, reducing the duplication of this hardware by a factor of N. Even in the embodiment described in conjunction with FIG. 5, where there are M instances of this hardware for the M memory banks 502, the duplication of this hardware is reduced by a factor of N/M.

Furthermore, another advantage is that the inventive index generation hardware can have a programmable mapping table. This allows various hardware signals to be mixed and selected to compose events. By contrast, in the prior art, events of interest are determined and then hardwired in an implementation, which limits flexibility. That is, in this embodiment of the invention, flexibility is provided as to how events are defined.

OTHER ALTERNATIVE EMBODIMENTS

It will be appreciated that, although specific embodiments of the invention have been described herein for purposes of illustration, various modifications may be made without departing from the spirit and scope of the invention. For example, whereas the hardware incrementer 108 of FIG. 1 has been described as having an adder 110 and an increment value register 112, the hardware incrementer 108 in other embodiments of the invention may have constituent components in addition to and/or in lieu of the adder 110 and the register 112. Furthermore, whereas the multi-node system 300 of FIG. 3 has been described as being a non-uniform memory architecture (NUMA) system, in other embodiments of the invention, the system 300 may be in accordance with other types of multiple-processor architectures. Accordingly, the scope of protection of this invention is limited only by the following claims and their equivalents.

We claim:

1. A hardware counter comprising:
a memory array storing a plurality of counter values indexable by an index constructed based at least on a number of a plurality of events to which the counter values correspond;
a hardware incrementer to read the counter values from the memory array by values of the index, increment the counter values, and write the counter values as incremented back into the memory array;
index generation hardware to generate the index; and,
hardware to read the counter values from the memory array by the values of the index and write the counter values to the memory array,
wherein the memory array is divided into a plurality of memory banks over which the plurality of counter values are stored, each memory bank having a separate instance of the hardware incrementer, and wherein the index globally indexes the plurality of counter values over the plurality of memory banks as a whole.

2. The hardware counter of claim 1, wherein the index is constructed as a number of bits binarily representing the number of the plurality of events.

3. The hardware counter of claim 1, wherein the index is constructed further based on a number of a plurality of qualifiers to the plurality of events.

4. The hardware counter of claim 3, wherein the index is constructed as a concatenation of a number of bits binarily representing the number of the plurality of events and a number of bits binarily representing the number of the plurality of qualifiers, such that each counter value corresponds to a unique combination of one of the plurality of events and one of the plurality of qualifiers.

5. The hardware counter of claim 3, wherein the index is constructed as a number of bits binarily representing a number of possibly occurring event-and-qualifier combinations, such that each counter value corresponds to a different one of the possibly occurring event-and-qualifier combinations, wherein a number of counter values is less than the number of the plurality of events multiplied by the number of the plurality of qualifiers.

6. The hardware counter of claim 5, further comprising index generation hardware to generate a value of the index for an input one of the possibly occurring event-and-qualifier combinations.

7. The hardware counter of claim 1, wherein the hardware incrementer comprises a hardware adder that adds an increment value to the counter values, such that results of adding the increment value to the counter values is written back into the memory array.

8. The hardware counter of claim 7, wherein the hardware incrementer further comprises a register storing the increment value.

9. The hardware counter of claim 1, wherein each memory bank has a separate instance of the index that indexes only those of the plurality of counters stored in the memory bank, each memory bank having associated therewith index generation hardware to generate the separate instance of the index for the memory bank.

10. A system comprising a plurality of nodes, each node having a processor and a performance counter operatively coupled to the processor to count occurrences of events, the performance counter having a lesser number of hardware incrementers than a number of the events of which the performance counter counts the occurrences, wherein the performance counter comprises:

a plurality of memory banks and a plurality of hardware incrementers corresponding to the memory banks, each memory bank storing counter values for counting the occurrences of some of the events, each hardware incrementer incrementing the counter values of the memory bank to which the hardware incrementer corresponds in response to the occurrences of the some of the events to which the counter values of the hardware incrementer correspond;

a memory array storing counter values for counting the occurrences of the events;

a single hardware incrementer to increment the counter values of the memory array in response to the occurrences of the events to which the counter values correspond;

index generation hardware to generate the index; and, hardware to read the counter values from the memory array by the values of the index and write the counter values to the memory array, and wherein the index globally indexes the plurality of counter values over the plurality of memory banks as a whole.

11. The system of claim 10, wherein the performance counter counts occurrences of combinations of events and qualifiers, the performance counter having a lesser number of the hardware incrementers than a number of the combinations of the events and the qualifiers of which the performance counter counts the occurrences.

12. The system of claim 10, wherein each node further comprises memory that is local to the processor of the node and remote to the processor of every other of the nodes.

* * * * *